July 30, 1946.  W. B. FAGEOL  2,404,794
VEHICLE SUSPENSION
Filed Aug. 7, 1943  3 Sheets-Sheet 1
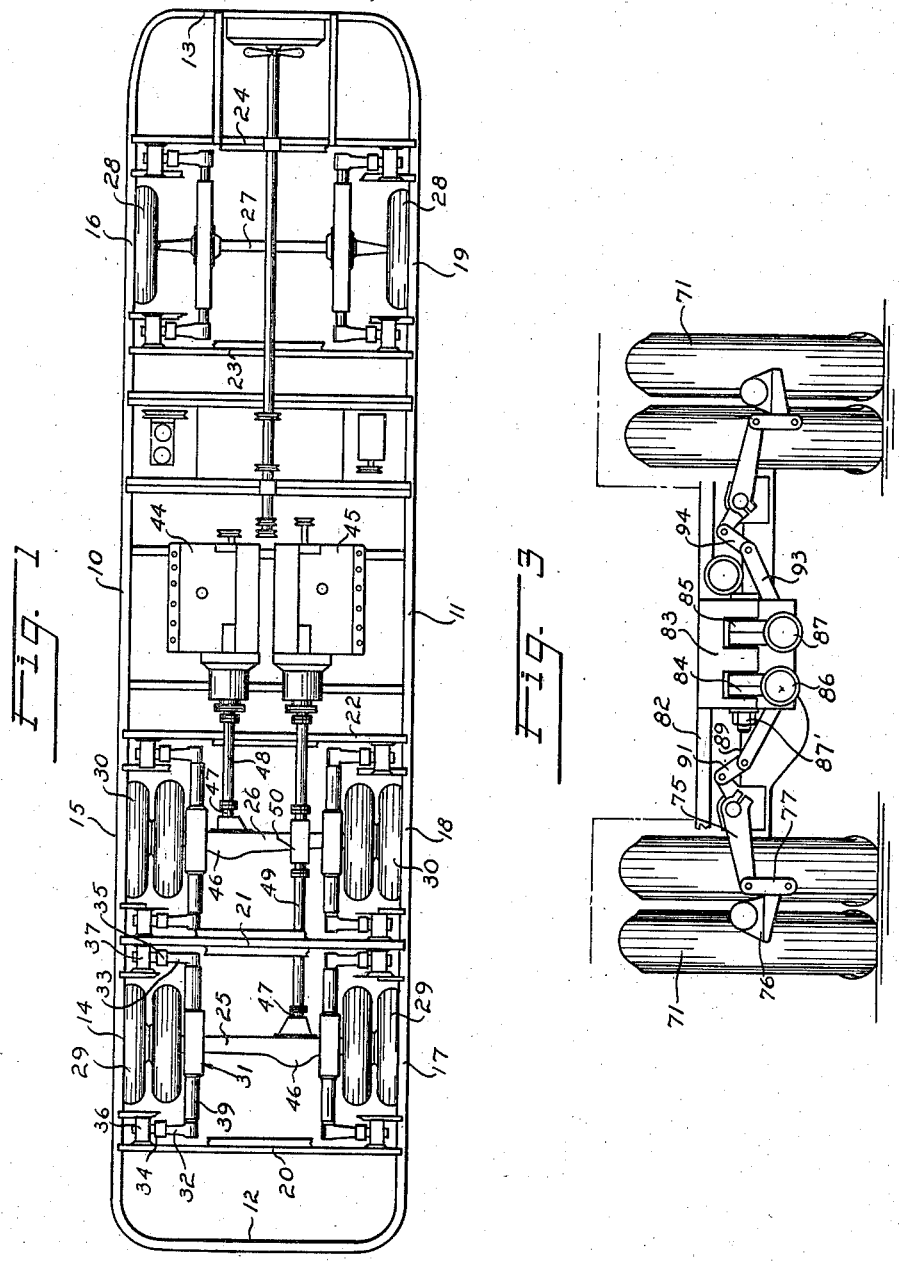
Inventor
William B. Fageol
By Strauch & Hoffman
Attorneys

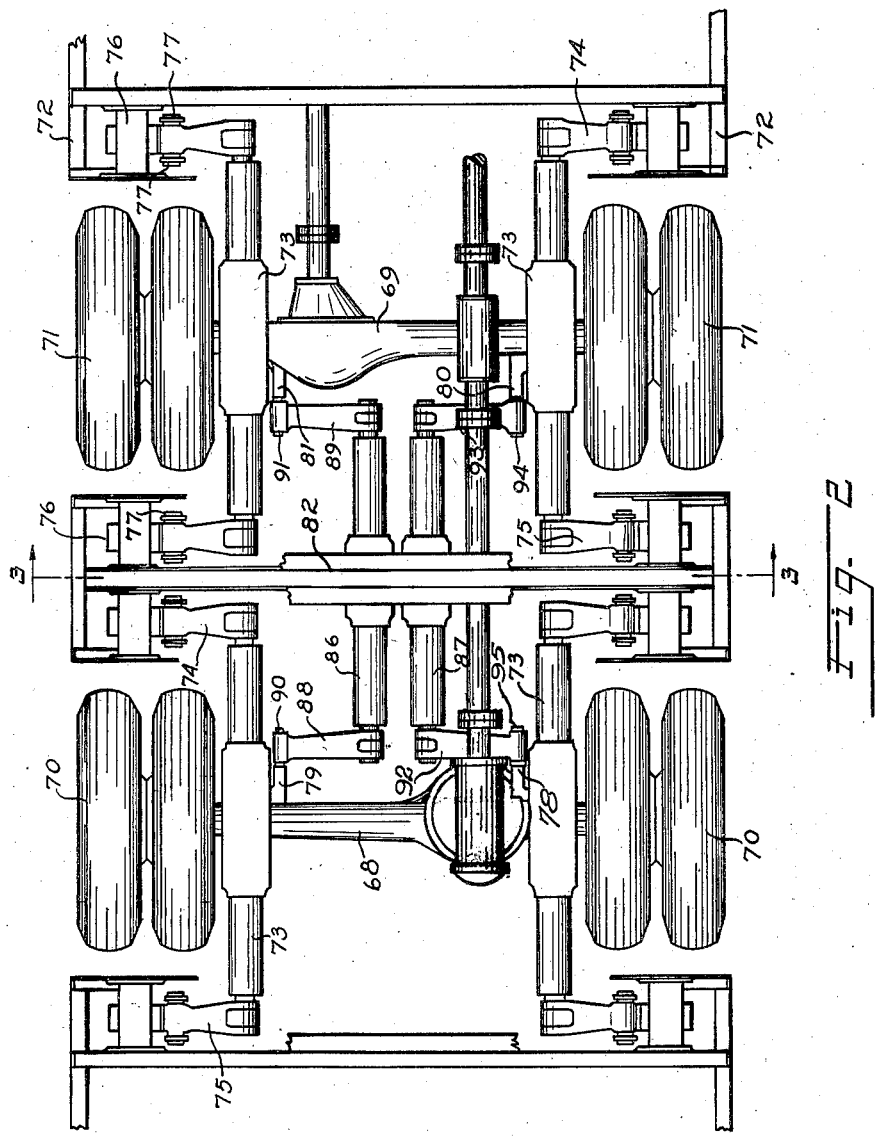

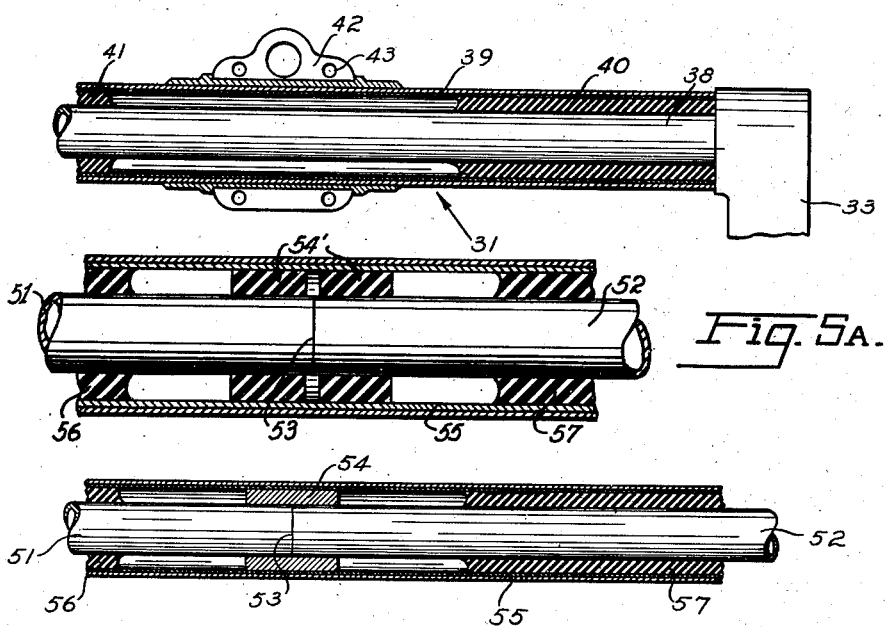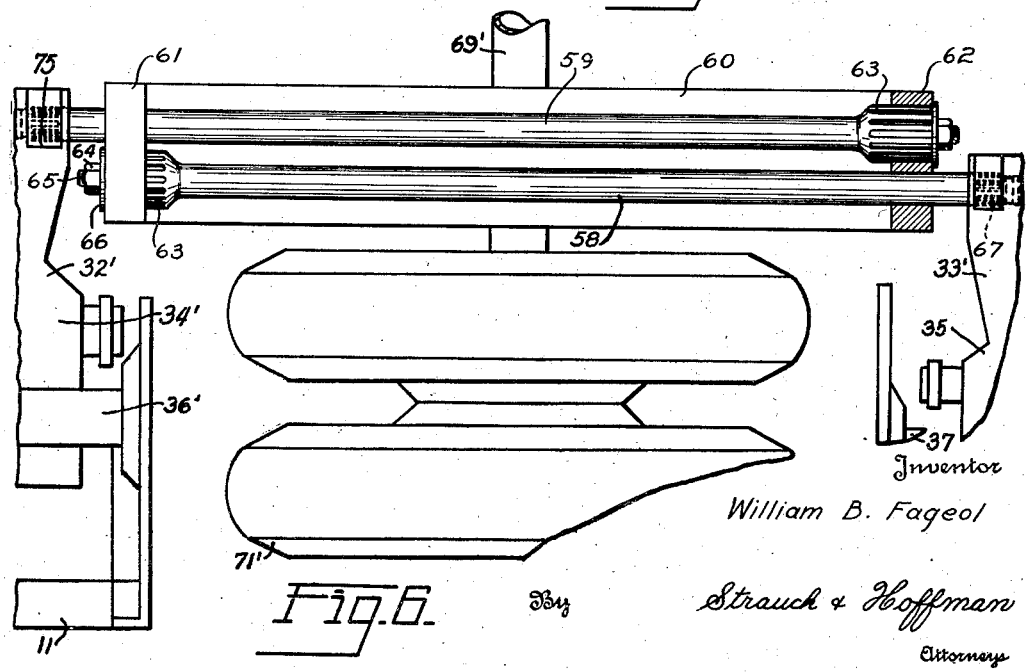

Patented July 30, 1946

2,404,794

UNITED STATES PATENT OFFICE 2,404,794

VEHICLE SUSPENSION

William B. Fageol, Kent, Ohio, assignor to Twin Coach Company, Kent, Ohio, a corporation of Delaware Application August 7, 1943, Serial No. 497,822

18 Claims. (Cl. 280—124)

This invention relates to light-weight multi-wheel road vehicles intended for use as trucks or buses. More particularly, the invention relates to a spring suspension adapted especially for trucks or buses of the type in which the lower members of the body frame are utilized as, and take the place of, the heavy chassis frame heretofore frequently employed in road vehicles.

Multi-wheel vehicles now in wide use generally include dual axles that are connected together to form a bogie-like unit, as by leaf-spring assemblies and tie or torque rods for example, or by sub-frame members, for further example, the unit then being transversely pivotally connected to the chassis so that the unit can rock on its pivot as the wheels supporting the dual axles rise and fall in rolling over road irregularities.

Such constructions result in a vehicle having a high center of gravity and of considerable weight. Furthermore, such constructions are relatively inflexible because of the interconnection of the axles to provide the bogie-like unit. Such units are frequently connected to the chassis by springs that permit little independence of action of the individual axles constituting the unit, it being impractical to provide for relative freedom of individual action of the separate axles of the unit because the pivotal connection of the unit to the frame is only at one transverse line.

The primary object of this invention is to provide a spring suspension for the dual axles of a multi-wheel road vehicle that will greatly lighten the vehicle, lower its center of gravity and at the same time provide a high degree of flexibility permitting substantial independence of spring action between the dual axles.

Another object of the invention is to provide a dual axle spring suspension in which use is made of torsion springs rather than the more conventional springs dependent in whole or in part on flexure.

Another object of the invention is to provide a torsion-spring suspension for dual axles that includes torsion springing in the connection of the individual axles to the frame and in the interconnection or equalizing connection between the two axles.

A still further object of the invention is to provide a spring suspension for dual axles of a road vehicle designed for ready application to the body frame members outwardly of the wheels supporting the axles thus permitting dispensing with longitudinal chassis frame members inwardly of the wheels.

This invention also aims to produce a multi-wheel road vehicle in which the dual axles have resilient connections to the body frame at a multiplicity of points spaced longitudinally of the frame while preserving the freedom of relative movement between the axles and frame essential to keep all of the wheels on the ground regardless of road inequalities.

A further important object of the invention is to provide a torsion-spring suspension for dual axles including crank arms disposed forwardly and rearwardly of the respective wheels for resiliently-resisted swinging movement in planes transverse to the vehicle frame, such arrangement causing an automatic limited self-steering or lateral movement of the non-dirigible wheels as the vehicle rounds a curve and the subsequent automatic restoration of said wheels to their normal and expected relative positions with respect to each other and to the frame.

Still another object of the invention is to provide a multi-wheel torsion spring suspension in which use is made of rubber sleeves or bushings applied in a manner to improve riding quality and to avoid the necessity of accurately fitting the suspension parts together, thus lowering the cost of production of the vehicle.

A still further object of the invention is to provide a dual axle spring suspension in which the axles are individually resiliently connected to the frame by torsion springs and in which the equalizing connection between the axles and frame includes a torsion-spring.

Still further objects of the invention of a subordinate character will appear as a description of the invention proceeds with reference to the accompanying drawings in which, Figure 1 is a plan view of the base frame of a multi-wheel road vehicle and parts associated therewith including one form of the present invention;

Figure 2 is an enlarged sectional plan view of a portion of the base frame and dual axles of another preferred form of the invention;

Figure 3 is a sectional view taken on the plane indicated by the line 3—3 on Figure 2;

Figure 4 is an enlarged longitudinal sectional view through one of the torsion-spring members of preferred form;

Figure 5 is a similar view of a modified form of torsion-spring member;

Figure 5A is a detailed section view of a further modification.

Figure 6 is a plan view, partly in section, of a further modified form of torsion-spring member.

Like reference characters indicate like parts through the several views.

A multi-wheel road vehicle is contemplated by the present invention of the so-called chassisless type. In vehicles of said type the base frame of the body, be it a bus or truck body, serves as the frame to which are attached the axles and other parts ordinarily supported by the heavy interconnected longitudinal chassis frame members.

Such a body base frame, taking the place of the ordinary chassis frame, is illustrated in the drawings and comprises longitudinally extending body frame members 10 and 11 extending from the front to the rear of the vehicle. Said members are united at the end of the vehicle by transverse frame members 12 and 13. In order to provide a body of maximum width the longitudinal members 10 and 11 are spaced apart a distance equal to or slightly greater than the overall length of the axles and wheels supporting the vehicle, said longitudinal frame members being bent upwardly at 14, 15, 16, 17, 18 and 19 to clear the underlying wheels in a manner now well understood in the art. Transverse body frame members 20, 21 and 22 rigidly secured at their ends to the longitudinal frame members 10 and 11 extend across the body base frame adjacent the dual axles, which support one end of the frame, providing a rigid base frame to which the axles are secured in a manner presently to be described. Further transverse frame members 23 and 24 rigidly secured at their ends to the longitudinal frame members 10 and 11 provide a rigid base frame portion to which the forward axle of the vehicle is secured through its spring suspension.

In the illustrated embodiment of the present invention, a six-wheel vehicle is illustrated, the rear end of the vehicle being supported on dual drive axles 25 and 26 while the forward end of the body is supported on a dead axle 27 supported by dirigible wheels 28 of conventional character. Wheels 29 and 30 sustain the axles 25 and 26 respectively.

Rigidly secured between its ends to each axle at points adjacent each end of each axle 25, 26 and 27 is a torsion-spring member 31. Said member carries at its opposite ends crank arms 32 and 33 projecting outwardly away from the longitudinal center of the frame toward the longitudinal frame members. The crank arms 32 and 33 are shackled by links 34 and 35 to brackets 36 and 37 rigidly secured to the base frame. All of the axles are secured to the base frame in like manner and only one of the like spring suspensions will be specifically described.

The length of the torsion-spring member 31 is such that the crank arms 32 and 33 at its ends are disposed forwardly and rearwardly of the wheels at the end of the axle to which said member is secured, and the points at which the ends of said crank arms are shackled to the frame are preferably located between vertical longitudinal planes which, at their intersection with the road, define the path of the tread of the wheel. Thus it will be seen that the torsion-spring member, the crank arm, shackle and bracket substantially surround each wheel inwardly of the frame.

The internal construction of the torsion-spring member 31 will be clear from Figure 4. It comprises a rod or tubular shaft 38 which carries at its ends the crank arms 32 and 33 already referred to. The shaft 38 passes through a tubular member 39 in spaced relation to the walls thereof. Shaft 38 and tubular member 39 are secured together by means of rubber or like resilient sleeve-like members 40 and 41 disposed adjacent opposite ends of the tube 39. Said sleeve-like elements 40 and 41 are non-rotatably secured to the tube and to the shaft as by a vulcanization or in an equivalent manner. The tube 39 is rigidly secured to a saddle 42 rigidly secured to the axle, said saddle being preferably made in two parts clamped together by bolts passing through apertures 43.

The torsion-spring assembly just briefly described may assume the exact form illustrated and described in my Patent No. 2,330,482, granted September 28, 1943, and, preferably, as illustrated and described in said patent, may include adjustment means there disclosed for conveniently adjusting the angular relation of the crank arms on the end of shaft 38.

Preferably, the drive axles 25 and 26 are driven by separate motors 44 and 45, respectively, said motors being suspended from the body base frame so as to be beneath or substantially beneath the floor line of the vehicle body. Axles 25 and 26 are preferably of the type that have their differential disposed substantially to one side of the longitudinal center of the axle, and the axles are reversely arranged as illustrated so that the differential mechanism of the axle 25 is disposed at one side of a longitudinal vertical central plane bisecting the vehicle and the differential mechanism of the axle 26 is disposed at the other side of said plane. This arrangement permits the motors 44 and 45 to be disposed in side by side relation with the axis of rotation of the output shafts disposed approximately in the horizontal plane containing the axes of the shafts 47 that drive the differential mechanisms of said axles. A relatively short flexible drive shaft 48 of conventional form may accordingly be used to operatively connect the motor output shaft with the shaft 47 of axle 26. Said shaft accordingly assumes very little angularity even when the axle 26 is in the extreme position that it may assume as the wheels that support it pass over substantial road irregularities. The motor 45 is connected to the axle 25 by a longer flexible drive shaft of conventional form 49, the mid-portion of which passes through a suitable journal 50 that is supported on the forwardly disposed axle 26. The shaft 49 is thus arranged and supported so that no portion thereof assumes any objectionable angularity as the axles move as permitted by their torsion-spring assemblies when the vehicle is driven over uneven roads. The torsion-spring members resist the torque tending to rotate the axle housings when the drive shafts exert their driving torque. No separate torque-resisting connections are accordingly required, thus simplifying the construction of the vehicle.

The operation of this form of the invention is as follows. When the wheels 30 of axle 26, for example, encounter an obstruction or depression in the road causing one or both ends of the axle to rise or fall, the torsion-spring assembly carried by that end of the axle is caused to rise or fall with it. Since the crank arms carried by said assembly are shackled to the frame, the movement of the axle and the torsion-spring member causes said arms to turn the shaft 38 about its longitudinal axis to a degree short of its elastic limit thus subjecting the torsion spring assembly to a twisting action. The resilient yield in the shaft and the further cushioned resilient yield in the rubber sleeve-like bushings 40 and 41 permit a substantial rotary movement of said shaft. Said sleeves and the shaft impose a substantial yielding resistance to the torsional forces thus imposed. When the wheels of the axle have passed over the hump or depression in the road, the inherent resilience in the shaft 38 and in the sleeves 40 and 41, which constitute in effect yielding bearings for said shaft, causes the crank arms to assume their normal position. The crank arms and shackles are preferably so angularly related that they are never caused to assume a straight angle relation under any resonable expected movement of the axle as more fully described in my Patent No. 2,330,482 already referred to.

If the wheels on axle 25 roll over road irregularities, the movement of axle 25 is resiliently resisted in a manner already described with particular reference to the axle 26. Inasmuch as the axle 25 is connected to the frame entirely independently of the axle 26, it will be understood that each axle will move entirely independently of the other. It has been found that, when torsion-spring assemblies, such as just described, are employed to independently attach the dual axles of a multi-wheel road vehicle to the frame, said assemblies possess sufficient flexibility to cause the wheels of said axles to remain on improved or relatively even roads without providing an equalizing connection between the axles or so connecting the axles to form a bogie-like truck. When the vehicle is operated over improved roads of the kind now widely built, the range movement of the dual axle is relatively small and within the range permitted by the independent connections to the frame and the torsion-spring suspensions employed. Accordingly, only relatively slight angularity is introduced in the drive shafts 48 and 49 extending from the motors to the axles.

The multi-wheel torsion spring vehicle just described is particularly intended for use in the construction of buses intended to operate on relatively smooth roads.

It has been found that the dual axles of the torsion-sprung multi-wheel vehicle just described has a highly desirable self-steering action in rounding curves. This seems to be due to the fact that the crank arms and shackles permit slight endwise movement of the axles or movement in a direction transverse of the frame. This is resisted by the torsion-spring members which again automatically align the wheels at the same side of the frame when the vehicle again follows a straight course. It is accordingly not necessary that the wheels of the dual axles at the same side of the vehicle be closely spaced. In multi-wheel vehicles of the type in which the dual axles are connected to form a bogie-like truck, it is necessary that the nondirigible wheels at the same side of the vehicle be closely spaced to avoid excessive dragging of the wheels over the road in rounding curves.

The torsion-spring member 31 may, if desired, assume the modified form illustrated in Figure 5 of the drawings. Said form comprises two shafts or tubes, 51 and 52, that carry the crank arms 32 and 33, respectively. The ends of said shafts abut at 53 and are journalled in a bearing bushing or sleeve 54 non-rotatively mounted centrally of tubular member 54, which member corresponds in structure, function and mounting to the tubular member 39 of the form of the invention illustrated in Figure 4. Bushing or sleeve 54 preferably is made of an oilless metallic bearing material permitting free relative rotation of the abutting ends of shafts 51 and 52 in the bushing.

A rubber or like sleeve 56 is secured to shaft 51 and externally to the tube 55, the arrangement being such that said shaft and tube constitute a unitary structure though limited rotation of shaft 51 with respect to tube 55 is permitted within the limits permitted by the inherent yield of the sleeve and the resilient yield of the shaft 51 when twisted about its longitudinal axis. Such yield provides the springiness needed in a torsion-spring member of this modified form. The shaft 52 is secured in a rubber or like sleeve 57 attached externally to the tube 55.

It will be understood that, when the modification just described is used, it functions similarly to that previously described except that the modified form has a higher degree of flexibility due to the fact that the rod or shaft extending through the tubular member of the torsion-spring assembly is made in two parts between which relative movement is possible; thus, in effect, providing largely independent springing of the crank arms 32 and 33.

If desired, a rubber bushing may be used instead of bearing sleeve 54, said bushing, if used, being secured to tubular member 55 and shafts 52 and 53. In such construction unusual stresses applied to one shaft would be resisted in part in said bushing and by twist of the other shaft transmitted through said bushing.

It will be understood further that, when a rubber bushing is used instead of bearing sleeve 54, said rubber bushing 54' may be divided into two parts on the plane of the abutting ends of shafts 51 and 52, as illustrated in Fig. 5A thus restoring the independence of springing action on crank arms 32 and 33 and thus making the torsion effect of each shaft dependent on the cumulative action of the several rubber sleeves that secure it within the tubular member 55.

In the further modification of the torsion-spring member illustrated in Figure 6 of the drawings, use is made of two parallel shafts 58 and 59 to provide the torsional yield. Said shafts are mounted in a plate-like member 60, which is broadly the equivalent of the tubular members 39 and 55 in the forms already described. Member 60 may be secured between its ends to an axle such as 69' in any approved manner. It has lugs or projections 61 and 62 extending outwardly in parallelism at or adjacent its opposite ends. Shaft 58 passes freely through an aperture in projection 62 and has an enlarged end 63 provided with keyways fitting matching keys in projection 61. A nut 64 threaded on a reduced end portion 65 of shaft 58 and a washer 66 holds said shaft in position at one end. The other end 67 is provided with keyways to receive crank arm 33', the opposite end of which is shackled to frame bracket 37 in a manner already described.

The shaft 59 is similar to shaft 58. It is mounted in reversed manner in member 60, its enlarged end being keyed in projection 62 and adjacent the other end journalled or freely passing through projection 61. At said other end a crank arm 32' is keyed and shackled at its free end to frame carried bracket 36'.

The operation of this form of the invention is similar to that first described. Torsional springing is provided, however, solely by twisting of the rods 58 and 59 within their elastic limits.

The present invention also contemplates a multi-wheel road vehicle capable of operation under the most severe road conditions. Trucks frequently are required to operate off of improved highways. When the present invention is applied to a truck or to a bus intended for operation over the roughest roads, the modified construction of Figures 2 and 3 is preferred. The construction of said figures differs from that already described mainly in that an equalizing interconnection between the torsion-sprung dual axles is provided, such interconnection insuring that all of the wheels shall remain on the ground regardless of the height of any obstruction or the depth of any depression over or through which the vehicle must be driven.

In said figures dual axles 68 and 69, supported by sets of wheels 70 and 71, respectively, are separately resiliently attached to one end of frame 72 of the specific construction already described, or of any other suitable construction. Said attachment is effected in like manner adjacent each end of each axle, and includes, as in the form of invention illustrated in Figure 1, torsion-spring members 73 rigidly secured to the axle between their ends. Said torsion spring members have crank arms 74 and 75 at opposite ends extending outwardly of the vehicle. The ends of said crank arms are shackled to the frame-secured brackets 76 by links 77, substantially as and for the purposes already pointed out with reference to Figure 1.

The equalizing interconnection between the axles already referred to includes projections 78 and 79 rigid with the housing of axle 68 protruding toward the other axle. The other axle 69 has projections 80 and 81, respectively, aligned with projections 78 and 79 and extending toward axle 68. Depending from transverse frame member 82 is a furcated bracket 83 (Figure 3). Between the furcations of said bracket, lugs 84 and 85 projecting from torsion-spring members 86 and 87 are pivoted on a pivot 87' extending through the bracket and said lugs (Figure 3).

Torsion-spring member 86 has crank arms 88 and 89 at its ends. The ends of said crank arms are shackled to the projections 79 and 81 of axles 68 and 69, respectively, by links 90 and 91.

Torsion-spring member 87 has crank arms 92 and 93 at its ends. The ends of said crank arms are shackled to the projections 78 and 80 of axles 68 and 69 respectively by links 94 and 95.

Torsion-spring members 73 may assume either the detailed form illustrated and already described with reference to Figure 4 or that of Figure 5 or of Figure 6 as will be understood by a person skilled in the art. The torsion-spring members 86 and 87 may likewise be constructed in detail as already described with reference to Figure 4 or to Figure 5.

The axles 68 and 69 may be driven in the same manner as already described with reference to Figure 1, or in any other known way.

The operation of the form of the invention illustrated in Figures 2 and 3 is as follows:

When the vehicle moves over the road and the wheels 70 and 71 encounter humps or fall into ruts, the axles 68 and 69 are caused to move toward and from the frame. Such movement is resisted for example as to the upper end of axle 69 (viewing Figure 2) primarily by the torsion spring member 73 and secondarily by torsion-spring member 86, which is caused to yield as the projection 81 carried by axle 69 rises or falls. If the movement of said end of the axle 69 does not assume any unusual degree, the torsion spring members yieldingly resist said movement and restore the axle to its normal operating position with respect to the frame without material movement of torsion-spring member 86 about its pivotal connection 88 to the frame. However, if the axle movement is of large degree in either direction, said torsion-spring member is caused to swing on said pivotal connection with the result that the end adjacent the other axle 68 is depressed or raised depending on whether the unusual movement of axle 69 is upward or downward. The effect of the swinging of torsion spring member 86 on its pivotal connection is accordingly to transfer a portion of the unusually severe shock on axle 69 to the other axle 68 through said spring member thus equalizing the load on the axles. In this way the traction of the wheels 70 and 71 on the road is preserved under the severest conditions.

This form of the invention also results in a desirable self-steering of the dual axles 68 and 69 already described with reference to Figure 1. When the vehicle rounds a curve the axles and wheels can temporarily shift laterally in opposition to the torsion-spring members which serve to restore them to normal positions after the curve has been rounded. Thus scuffing of the tires on the road is avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring suspension for dual axles of a multi-wheel vehicle comprising torsion spring members secured adjacent opposite ends of each axle and having crank arms shackled to the frame adjacent the ends of said arms and further equalizing torsion spring members extending transversely to the axles and pivoted to the vehicle frame between the axles and having crank arms at their ends shackled to the respective axles.

2. A spring suspension for dual axles of a multi-wheel vehicle at each side of a vertical plane extending centrally longitudinally of the vehicle frame, comprising three torsion spring members, two of said members being secured to the respective axles and shackled to the frame and the third being pivoted between its ends to the frame and shackled adjacent its ends to the axles.

3. A spring suspension interconnecting one end of each of two axles to the vehicle frame and to each other, comprising three torsion spring members arranged in parallelism lengthwise of the frame, two of said spring members resiliently uniting the axles to the frame and the third constituting a resilient equalizing connection between the axles.

4. A multi-wheel vehicle, comprising a frame, dual axles supporting one end of said frame, wheels on said axles, brackets on said frame forwardly and rearwardly of said wheels, torsion spring members extending transversely of and secured between their ends to said axles, crank arms on said members extending outwardly toward said brackets, links shackling said arms to said bracket, and equalizing connections between said axles pivoted to said frame and shackled to said axles inwardly of said members.

5. The combination of claim 4 in which said equalizing connections include torsion-spring members and crank arms providing resilience in said connections.

6. A multi-wheel road vehicle comprising a frame, dual axles, connections between said frame and axles including torsion spring members, and an equalizing interconnection between said axles including a further torsion spring member pivoted to the frame.

7. The combination defined in claim 6 in which each of said torsion spring members consists in a tubular element, a shaft having crank arms and a sleeve-like torsion element of inherently resilient material secured in surrounding relation to said shaft and externally fixedly attached to said tubular element.

8. A multi-wheel road vehicle comprising dual axles supported by wheels, a frame extending beyond said wheels, brackets on said frame forwardly and rearwardly of each wheel of each axle, torsion spring members secured to said axles and including crank arms extending outwardly toward said brackets, shackles linking said arms and said brackets, and equalizing interconnections between said axles and frame disposed between said torsion spring members.

9. A multi-wheel road vehicle, comprising a frame, dual axles, torsion spring members independently connecting each end of each of said axles to said frame, and means to transfer any movement of unusual degree in one axle to the other axle in the reverse direction consisting in a member pivoted to the frame between the axles and shackled adjacent its ends to said axles respectively.

10. The combination defined in claim 9 in which said last-named member consists in a torsion spring assembly comprising a tubular element, a shaft having crank arms at its end, and a torsion-resisting connection between said element and shaft housed within said element.

11. A spring suspension for dual axles of a multi-wheel vehicle comprising at each side of the vehicle three torsion spring assemblies united to said frame at five points.

12. The combination of claim 11 in which four of said points are located between longitudinal vertical planes defining at their intersection with the road the path of movement of the wheels supporting said axles.

13. A torsion spring suspension comprising a member rigidly secured perpendicular to the axle adjacent a wheel, a torsion rod having a portion substantially coextensive with said member and one end non-rotatively secured to said member forwardly of said wheel and a crank arm at its other end extending outwardly at the rear of said wheel, a link shackling said arm to the frame outwardly of said wheel, and a second like torsion rod arranged reversely of said first-named rod and non-rotatively secured to said member rearwardly of the wheel and having a crank arm forwardly of the wheel, and a link shackling said last-named arm to the frame.

14. A multi-wheel road vehicle comprising a frame, a pair of drive axles supported by wheels disposed beneath said frame, torsion spring assemblies interconnecting each end of each axle to the frame, including crank arms disposed forwardly and rearwardly of each wheel and torsion members secured transversely to the axles and carrying said arms, whereby a resiliently resisted limited lateral self-steering movement of said wheels may occur, power means supported on said frame, a drive shaft extending from said means to said axles, whereby said torsion members resist the torque of said drive axles, and torsion spring equalizing interconnections between said axles.

15. The combination defined in claim 14 in which said torsion members are disposed in or approximately in the horizontal plane containing the axes of rotation of said wheels.

16. A multi-wheel road vehicle comprising a frame; dual axles supported by non-dirigible wheels; and torsion spring members, each comprising two parallel shafts secured to an axle against bodily movement and held from rotation at opposite ends, individually connecting said axles to said frame through crank arms and shackles disposed transversely thereof.

17. An equalizing spring connection between the dual axles of a multi-wheel vehicle, comprising a tubular element pivoted to the frame between its ends, a shaft extending through said element and having crank arms at its ends shackled to said axles; and an inherently resilient sleeve-like element secured around said shaft and externally to said tubular element whereby said shaft and said sleeve-like element torsionally resist relative movement of said axles.

18. A torsion spring suspension for connecting the axle of a road vehicle to the frame comprising a member rigidly secured adjacent one end of the axle; a torsion rod held by said member against bodily movement with one end non-rotatably secured to said member; a crank arm connected to the other end of said rod; a link shackling said arm to said frame; a second like torsion rod arranged reversely of said first named rod and having one end non-rotatably secured to said member and a crank arm at its other end; and a link shackling said last named arm to the frame.

WILLIAM B. FAGEOL.